United States Patent
Rajan et al.

[11] Patent Number: 5,940,596
[45] Date of Patent: Aug. 17, 1999

[54] CLUSTERED ADDRESS CACHING SYSTEM FOR A NETWORK SWITCH

[75] Inventors: Sundar Rajan, Santa Clara; Kent Blair Dahlgren, San Jose, both of Calif.

[73] Assignee: I-Cube, Inc., Campbell, Calif.

[21] Appl. No.: 08/905,440

[22] Filed: Aug. 4, 1997

Related U.S. Application Data

[63] Continuation-in-part of application No. 08/622,764, Mar. 25, 1996, Pat. No. 5,754,791.

[51] Int. Cl.$^6$ .................................................. G06F 15/163
[52] U.S. Cl. ................... 395/200.72; 370/400; 370/402; 340/825.52
[58] Field of Search .................. 395/200.72, 200.73, 395/200.68; 340/825.52; 370/402

[56] References Cited

U.S. PATENT DOCUMENTS

| | | | |
|---|---|---|---|
| 5,227,778 | 7/1993 | Vacon et al. | 340/825.52 |
| 5,412,648 | 5/1995 | Fan | 370/414 |
| 5,754,791 | 5/1998 | Dahlgren et al. | 345/200.72 |

*Primary Examiner*—Moustafa M. Meky
*Assistant Examiner*—Hiev C. Le
*Attorney, Agent, or Firm*—Smith-Hill and Bedell

[57] ABSTRACT

A network switch forwards data packets between network stations connected to its input and output ports. Each data packet includes the network address of a destination station. The receiving input port consults an address translation system including a local address translation cache within each input port for caching recently used address-to-port translation information, a set of secondary address translation units each serving a separate cluster of input ports for caching a larger amount of recently used address translation information, and a main address translation unit storing address-to-port translation information for all network stations. An input port not having appropriate translation information in its local cache sends an address translation request to a secondary address translation unit. A secondary address translation unit not having appropriate address translation information to respond to the request, forwards the request to the main address translation unit. The main address translation unit returns the appropriate address translation information to the secondary address translation unit which caches that information and returns it to the requesting input port. The input port caches the information locally and then forwards the packet to the indicated output port.

10 Claims, 10 Drawing Sheets

CLUSTERED ADDRESS CACHING SYSTEM FOR A NETWORK SWITCH

CROSS-REFERENCE TO RELATED APPLICATIONS

The present application is a continuation-in-part of U.S. application Ser. No. 08/622,764 filed Mar. 25, 1996 now U.S. Pat. No. 5,754,761.

BACKGROUND OF THE INVENTION

1. Field of the Invention

The present invention relates to a switch for forwarding data transmissions between stations of a network, and in particular to a network switch having a clustered address translation system for mapping each station's network address to a switch port servicing the station.

2. Description of Related Art

Computer networks transfer data between computers or other types of network stations. For example 10BASE-T Ethernet systems use sets of twisted pair conductors in a star network topology to connect network stations to a central hub. A 10BASE-T hub is simply a repeater for receiving a data packet from any one station and concurrently rebroadcasting it to all other stations. A header in the data packet includes the network address of the intended destination station for the packet and each network station looks at the packet header to determine if it should the accept or ignore an incoming packet. Since each transmission is sent concurrently to all stations, only one network station can transmit a packet at any given time.

A network switch, unlike a network hub, forwards a data packet only to destination stations connected to a particular switch port so that not every network station receives the packet. A network switch includes a switching mechanism such as a crosspoint switch for selectively forwarding each incoming packet from an input port to an appropriate output port. The input port determines the destination output port from the network address included in the packet header and then requests a connection between the input port and the destination output port. When the connection is established, the input port sends the packet to the output port via the crosspoint switch.

Although a packet arriving at a switch port contains the network address of the station to which it is directed, the switch must relate that station's address to the station's switch port before it can forward the packet. The process of relating a network address of a destination station to the station's switch port is problematic. In a typical prior art system, as illustrated in U.S. Pat. No. 5,412,648 issued May 2, 1995 to Ruixue Fan, each input port stores an incoming packet, extracts the destination address from the packet's header and then forwards it to a central address translation unit. The central address translation unit, which maintains a look-up table relating network addresses to switch output ports, returns the output port identification (ID) to the input port. The input port then requests a connection through the switch to the indicated output port and forwards the packet to that output port. Each input port must compete with other input ports for access to the central address translation unit and as packet traffic increases so too do delays in obtaining address translations.

What is needed is a network switch in which input ports can rapidly translate network addresses into port IDs with minimal delay due to competition for central address translation services.

SUMMARY OF THE INVENTION

A network switch forwards data packet transmissions between uniquely addressed network stations connected to input and output ports of the switch. Each data packet includes a header containing the network address of the network station to receive the packet. Each switch input port includes a local address translation unit in which it stores a small set of address-to-port translation information for its most recently received data packets. When an incoming data packet arrives at any switch input port, the input port reads the network destination address included in the packet's header and checks its local address translation unit to see if the cache includes an entry identifying a switch output port to receive packets directed to the destination station. If so, the input port forwards the packet to the identified output port.

If the appropriate address translation information does not appear in the local address translation unit, the input port sends a translation request to an external secondary address translation unit via a cluster bus. There are several separate secondary address translation units, each servicing translation requests from a separate "cluster" of the switch input ports linked to the secondary address translation unit via a common "cluster" bus. Each secondary address translation unit also has a cache for storing somewhat more address translation information than is stored by each local address translation unit. On receiving an address translation request, a secondary address translation unit checks its internal address translation unit to see if it contains the appropriate translation information it needs to respond to the request. If it does, the secondary address translation unit sends a response containing a copy of that translation information back to the requesting local address translation unit. The local address translation unit then stores that information in its cache memory, writing over the least recently used translation data stored therein, and then tells the input port to forward the packet to the appropriate switch output port.

If the secondary address translation unit does not have the appropriate address translation data in its cache to respond to a translation request, it forwards the request to a main address translation unit which services requests from several secondary address translation units. If the main translation unit has the appropriate translation data in its cache, it returns that data to the requesting secondary address translation unit. The secondary address translation unit stores that translation data in its cache writing over its least recently used translation data, and forwards the translation information back to the local translation unit for storage therein. Thus each successive address translation level responds to translation requests if it can and forwards them to the next higher translation level if it cannot. The main translation unit has a memory large enough to store address translation data for all network stations.

Since a network station is typically more likely to send a data transmission to one of the network stations to which it most recently transmitted data, the cache in the local address translation unit in each input port significantly reduces competition for access to the central address translation unit and therefor improves system throughput, particularly during times of heavy network traffic.

It is accordingly an object of the present invention to provide a network switch for quickly forwarding data transmissions between network stations with minimal address translation delay.

The concluding portion of this specification particularly points out and distinctly claims the subject matter of the present invention. However those skilled in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWING(S)

DESCRIPTION OF THE PREFERRED EMBODIMENT(S)

Figure 1:
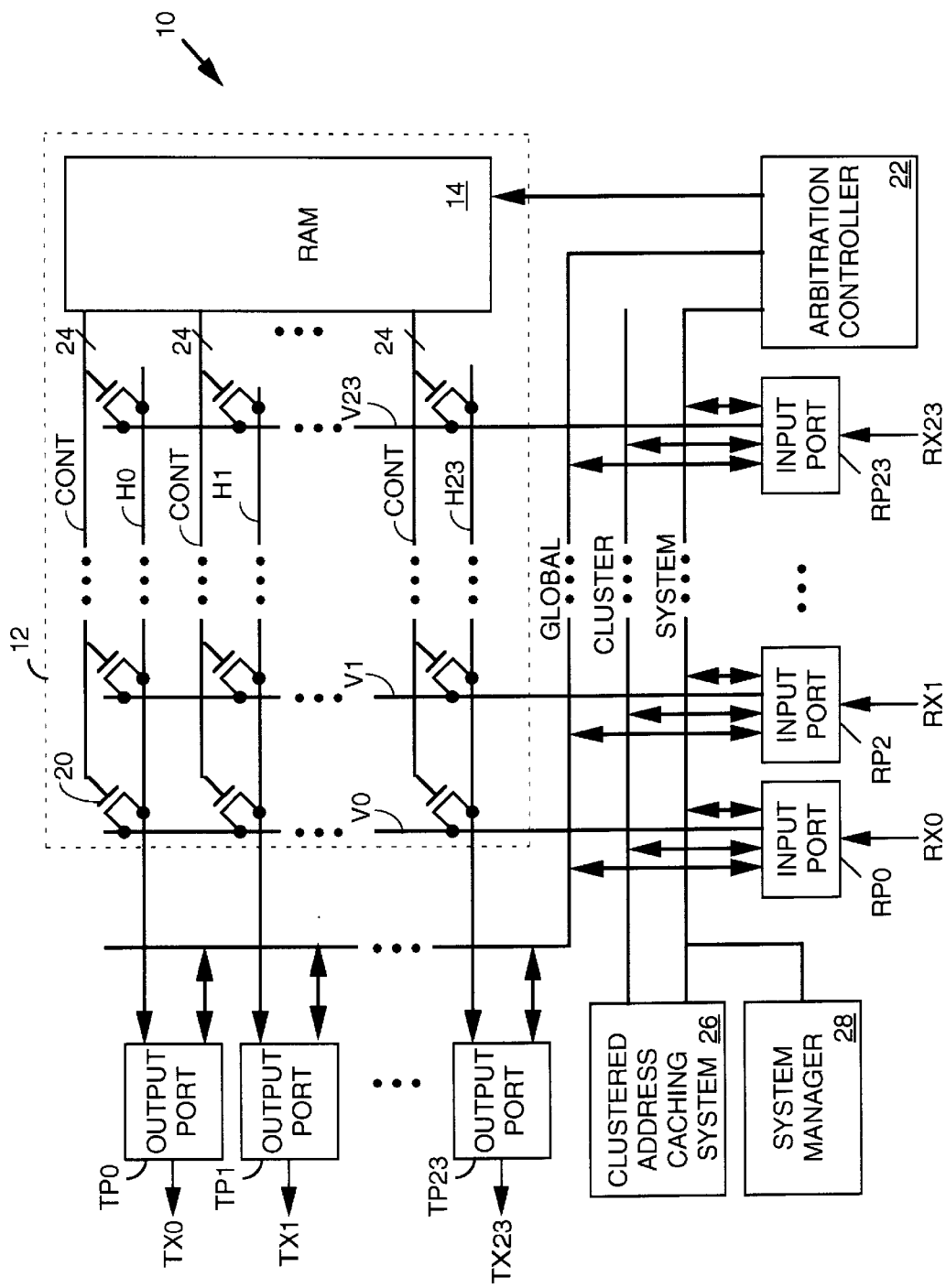
FIG. 1 illustrates in block diagram form a local area network switch including a clustered address caching system in accordance with the present invention.

FIG. 1 illustrates a local area network (LAN) switch 10 for forwarding data transmissions between a set of network stations (not shown). Network switch 10 includes a set of input ports RP0–RP23, each receiving incoming packets arriving from one or more network stations on a corresponding one of input buses RX0–RX23. Network switch 10 also includes a set of output ports TP0–TP23, each forwarding data packets outward on a corresponding one of output buses TX0–TX23 to one or more network stations. Normally each network station will be linked to corresponding input and output ports. Each input port RP0–RP23 is connected to a crosspoint switch 12 via a corresponding one of switch input lines V0–V23 and each output port is connected to switch 12 via a corresponding one of switch output lines H0–H23. Switch 12 forwards each incoming data packet arriving from an input port via one of input lines V0–V23 to the appropriate output port via one of switch output lines H0–H23. The output port forwards the packet to the destination station. It should be understood that while, for illustrative purposes, the network switch 10 of FIG. 1 is shown as having 24 input and output ports, switch 10 may be much larger. It is also possible to create a larger network by interconnecting ports of more than one network switch 10. Thus an input/output port pair of switch 10 could be connected either to one or more network stations or to an input/output port pair of another network switch.

Packet Forwarding

Each network station has a unique network address and each input/output port pair in switch 10 has a unique identification number (ID). Each data packet arriving at any input port RP0–RP23 via one of input buses RX0–RX23 includes a header containing the network address of the destination network station to receive the packet. When a packet arrives at one of input ports RP0–RP23 the input port stores the packet and reads a network destination address included in the packet header. With the help of a clustered address translation system 26 (described herein below), the input port converts the destination address into the ID of the output port TP0–TP23 serving the destination station. The input port sends the output port ID to an arbitration controller 22 via a bus (GLOBAL) to request a connection through switch 12 to the identified output port. The output ports TP0–TP23 signal arbitration controller 22 via the GLOBAL bus when they are idle, not currently receiving a data packet from any other input port. When the requested output port becomes idle, the arbitration controller 22 establishes the requested connection through switch 12 and signals the requesting input port that it may begin transmitting the packet to the output port via switch 12. As the output port receives the data packet, it stores it in an internal buffer memory and later forwards the packet to the destination network station via its output bus TX0–TX23.

As discussed below, a system manager 28 accesses input ports RP0–RP23 and caching system 26 to gather network traffic statistics, to block network transmissions to and from selected network addresses, to handle errors, and to initiate system reset.

Crosspoint Switch

Crosspoint switch 12 includes the set of 24 "vertical" input lines (conductors) V0–V23, each connected to a corresponding one of input ports RP0–RP23 and the set of 24 "horizontal" output lines H0–H23, each connected to a corresponding one of output ports TP0–TP23. Switch 12 includes an array of CMOS pass transistors 20, each having source and drain terminals connected to one of horizontal lines H0–H23 and to one of vertical lines V0–V23. A random access memory (RAM) 14 stores 24 24-bit words and supplies a separate control signal CONT to the gate of each transistor 20. When a CONT signal is asserted, it turns on a pass transistor 20, thereby establishing a signal path between one of vertical lines V0–V23 and one of horizontal lines H0–H23. The state of each CONT signal supplied to a transistor 20 of the Jth row of transistors 20 is determined by a corresponding bit of a Jth data word stored in RAM 14. Arbitration controller 22 grants connection requests from the input ports RP0–RP23 by writing data to RAM 14, thereby making and breaking signal forwarding paths through switch 12. Thus the data written into RAM 14 acts as a forwarding command to switch 12 for forwarding data therethrough.

Input Port

Figure 2:
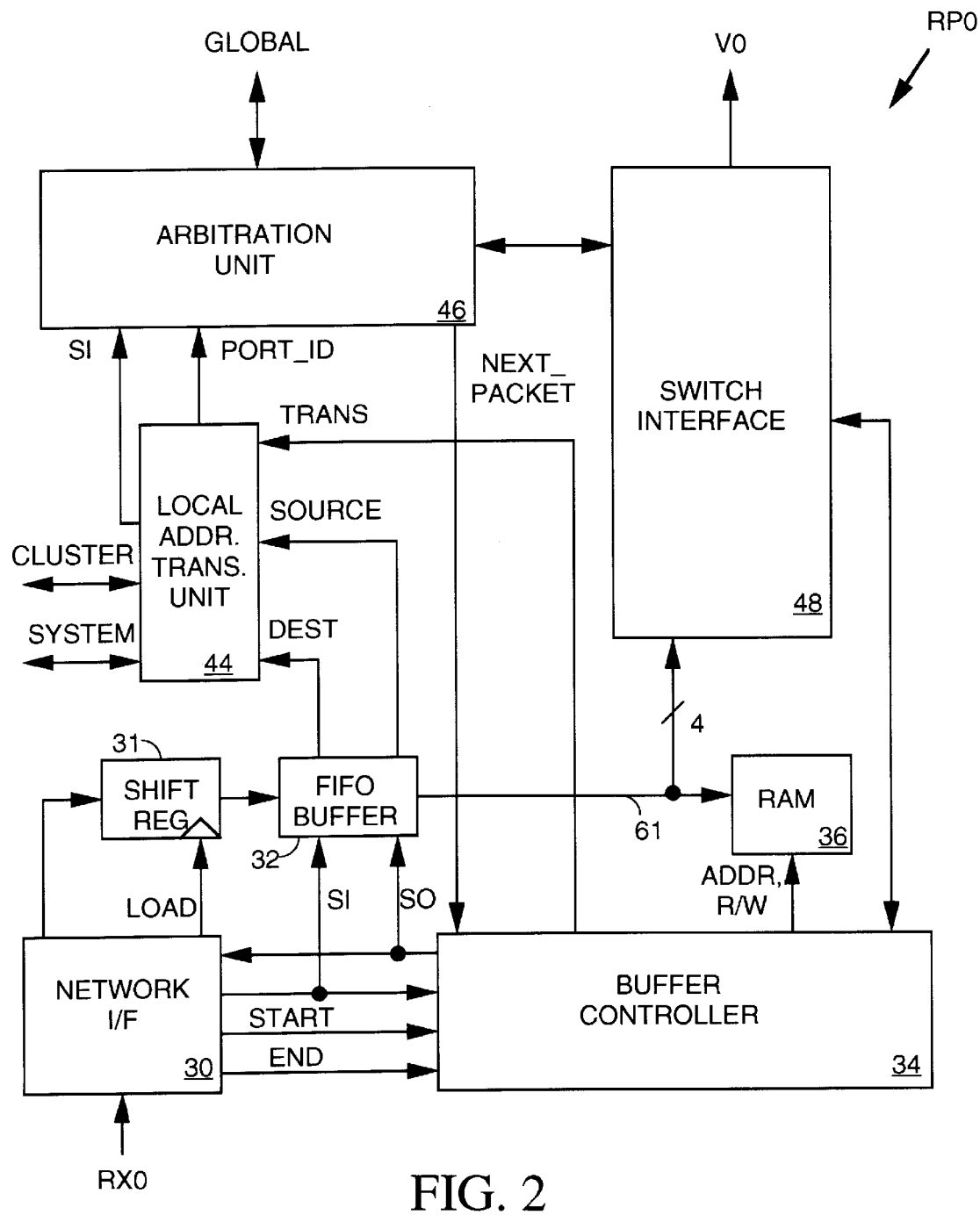
FIG. 2 illustrates a typical input port of FIG. 1 in more detailed block diagram form.

FIG. 2 illustrates input port RP0 of FIG. 2 in more detailed block diagram form. Input ports RP1–RP23 are similar. A network station transmits a data packet to input port RP0 in serial form via bus RX0 using Ethernet 10BASE-T protocol. The data packet, formatted as a standard Ethernet protocol data unit, is of variable length and includes the fields illustrated in Table I:

TABLE I

| Field | Field Length | Purpose |
| --- | --- | --- |
| PREAMBLE | 7 bytes | Used for synchronizing |
| START | 1 byte | Start of frame delimiter |
| DEST | 6 bytes | Destination Network address |
| SOURCE | 6 bytes | Source Network address |
| TYPE/LEN | 2 bytes | Type or length of data field |
| DATA | 46–1500 bytes | Data field |
| CRC | 4 bytes | Frame check field |

The PREAMBLE and START fields are fixed data patterns that are the same for all packets. The DEST field indicates the network address of the station to receive the packet. The SOURCE field indicates the network address of the station that sent the packet. The TYPE/LEN fields may indicate either the packet type or the length of the DATA field, depending on the protocol being employed. The DATA field holds the packet payload data and may be from 46 to 1500 bytes long. The CRC field is a frame check field used by the receiving station to determine whether the packet has been corrupted in transmission.

Referring to FIG. 2, a conventional 10BASE-T network interface circuit 30 receives the incoming packet arriving on input bus RX0. A carrier signal conveyed on the bus indicates the beginning and end of packet transmission. As each bit of a data packet arrives, the network interface circuit 30 pulses a LOAD signal to store the bit in a 4-bit serial-in/parallel out shift register 31. When the first 4-bit "nibble" (half byte) of the data packet following the preamble has been loaded into register 31, interface circuit 30 asserts a shift-in (SI) signal to a first-in/first-out (FIFO) buffer 32, causing the FIFO buffer to store the nibble. Interface circuit 30 loads each successive nibble of the data packet into buffer 32.

When the longest stored nibble in FIFO buffer 32 is the first nibble of a data packet following the preamble, network interface circuit 30 transmits a START signal to a buffer controller 34. Buffer controller 34 controls the storage of data packets in a random access memory (RAM) 36. On receipt of the START signal, buffer controller 34 begins pulsing a shift-out signal (SO), each pulse causing FIFO buffer 32 to shift a 4-bit data nibble out to RAM 36 via a 4-bit data bus 61. RAM 36, controlled by address and read/write control signals generated by buffer controller 34, stores the packet data nibbles at sequential addresses. Network interface circuit 30 counts each packet nibble loaded into FIFO buffer 32 and also counts pulses of the SO signal produced by buffer controller 34 to determine how many nibbles controller 34 has stored in RAM 36. After interface circuit 30 shifts the last nibble of a packet into FIFO buffer 32, it continues to count the number of nibbles the buffer controller 34 shifts out of buffer 32, and sends an END signal to controller 34 to tell it that it has acquired the last nibble of the packet. Buffer controller 34 also counts nibbles of incoming packet data as they are stored in RAM 36. After receiving the END signal from network interface 30, controller 34 stores its count in RAM 36 as a LENGTH field in a header portion of the packet. When the packet is later forwarded to an output buffer, the output buffer determines the length of the packet from the LENGTH field.

As it loads packet data into RAM 36, buffer controller 34 determines from its nibble count when the data packet's source and destination fields (SOURCE, DEST) appear in FIFO buffer 32. At that point buffer controller 34 sends a translate signal (TRANS) pulse to a local address translation unit 44. The local address translate unit 44 then acquires the SOURCE and DEST data. As described in more detail herein below, local address translation unit 44 stores data relating network addresses to switch ports and uses that data to convert the acquired DEST field identifying the packet's destination station into the ID of the output port to which the destination station is connected. When local address translation unit 44 already stores the appropriate translation data, it delivers the destination port ID (PORT_ID) to an arbitration unit 46. When the local address translation unit 44 does not store the data it needs to translate a network address to a switch port ID, it obtains the necessary translation data from the clustered address caching system 26 of FIG. 2 and then delivers the destination port ID to arbitration unit 46.

When, for example, arbitration controller 22 of FIG. 1 polls input port RP0 via the GLOBAL bus to determine whether the input port has a pending connection request, arbitration unit 46 returns a forwarding request to arbitration controller 22, the request containing the destination output PORT_ID for the packet longest stored in RAM 36. When arbitration controller 22 thereafter configures crosspoint switch 12 to forward the packet to the output port identified by the PORT_ID in the connection request from arbitration unit 46, for example port TP10, it signals the arbitration unit 46 within input RP0 that its request is granted. Arbitration unit 46 responds by sending a NEXT_PACKET signal to buffer controller 34. Buffer controller 34 then sends the packet sequentially out of RAM 36 to the vertical switch line V0 via a switch interface unit 48. Switch interface unit 48 encodes the packet to add messages identifying its beginning and end. Switch 12 of FIG. 1 forwards the packet to output port TP10. Output prot TP10 decodes the messages that the input port inserted into the packet to determine when the packet begins and ends and forwards the packet to the destination station (or to another network switch to which the destination station may be connected) via its output network bus TX10. The output port TP10 then signals arbitration controller 22 via the GLOBAL bus that it has received the end of the transmission and that it is now idle.

Address Translation

The local address translation unit 44 (FIG. 2) within each input port RP0–RP23 of switch 10 (FIG. 1) as well as similar local address translation units 44 within input ports of other network switches form a part of a clustered address translation system 26 in accordance with the present invention.

Figure 3:
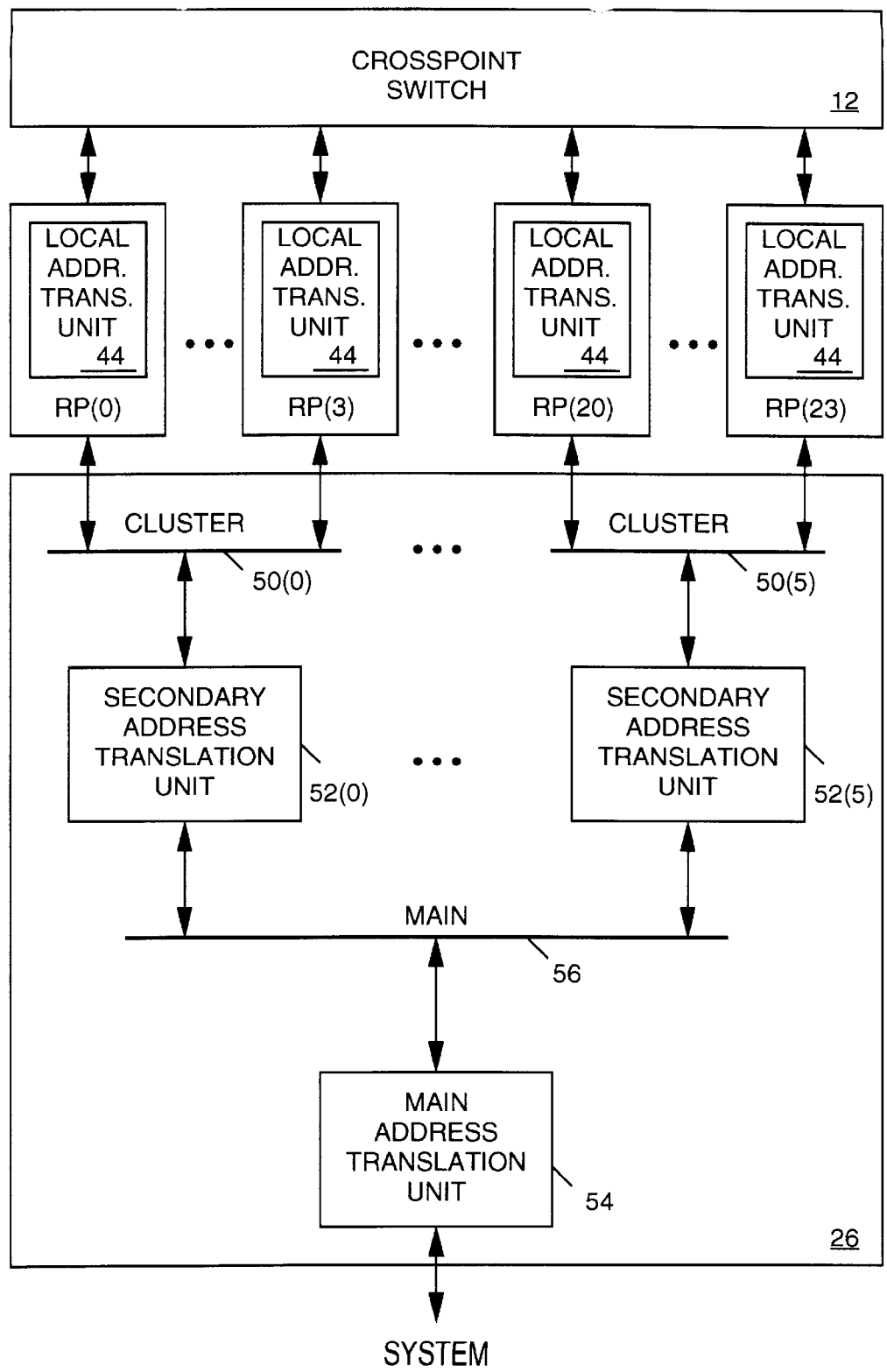
FIG. 3 illustrates the clustered address caching system of the network switch of FIG. 1 in more detailed block diagram form.

FIG. 3 illustrates the clustered address translation unit 26 of FIG. 1 in more detail. The local address translation units 44 of each set of four input ports RP0–RP3 ... RP20–RP23 are interconnected via a separate CLUSTER bus 50(0)–50(5) to one of six secondary address translation units 52(1)–52(5). The secondary address translation units 52(1)–52(5) all communicate with a main address translation unit 54 via a MAIN bus 56.

When, for example, input port RP0, receives an incoming packet directed to a network station connected to output port RP20, it sends both the source and the destination network addresses included in the packet header to its internal local address translation unit 44. The local address unit includes an internal look-up table relating the network addresses of various network stations to the switch input/output ports through which the network stations communicates. The input port's look-up table has only 64 entries so it can only translate up to 64 different source or destination network addresses to corresponding switch input or output ports. Thus each local address translation unit 44 stores (caches)

address translation information for only the 64 most recently performed source or destination address translations.

When it reads the source and destination addresses in an incoming data packet, the local address translation unit 44 determines whether the source and destination addresses appear as entries in its look-up table. If so, the local address translation unit 44 immediately translates the destination address to a corresponding destination PORT_ID and sends the destination PORT_ID to arbitration unit 46 (FIG. 2) as described above.

When the local address translation unit 44 does not have a table entry for a source address conveyed in the incoming packet header, it sends the source address and its own input port ID as a translation request to its secondary address translation unit 52(0) via CLUSTER bus 50(0). The secondary address translation unit 52(0) includes another look-up table capable of storing several hundred entries, each relating a network address to a switch port. When the secondary address translation unit 52(0) receives the translation request, it checks its look-up table to determine if it has an entry for that network address containing a port ID matching the port ID contained in the translation request. If it does, the secondary address translation unit 52(0) returns a translation response to the local address translation unit which then caches the source address and port ID in its own look-up table.

If the secondary address translation unit 52(0) does not have an entry for the source address containing an ID matching the ID included in the translation request, it forwards the translation request to main address translation unit 54 via MAIN bus 58. MAIN address translation unit 54 maintains a large address translation look-up table containing an entry for every known network address and its corresponding switch port ID. Whenever it receives a translation request including a source address and its associated switch port ID, the main address translation unit 54 adds a new entry for that source address or updates any existing look-up table entry for that source address. It then returns an address translation response to the secondary address translation unit 52(0). The secondary address translation unit 52(0) then updates its own look-up table entry for that source address and forwards the response to local address translation unit 44. The local address translation unit 44 then caches the source address.

When the local address translation unit 44 does not have a table entry for a destination address conveyed in the incoming packet header, it holds the packet and sends the destination address as a translation request to its secondary address translation unit 52(0) via CLUSTER bus 50(0). The secondary address translation unit 52(0) checks its look-up table to determine if it has an entry for that network destination address. If it does, the secondary address translation unit 52(0) returns a translation response to the local address translation unit 44 which then caches the destination address and port ID in its own look-up table and forwards the packet to the indicated switch port.

If the secondary address translation unit 52(0) does not have an entry for the destination address containing an ID matching the ID included in the translation request, it forwards the translation request to main address translation unit 54 via MAIN bus 58. MAIN address translation unit 54 then checks its look-up table entry for that network address to determine its corresponding port ID and returns the network address and port ID in an address translation response to the secondary address translation unit 52(0). The secondary address translation unit 52(0) then updates its own look-up table entry for that network address and forwards the translation response to local address translation unit 44. The local address translation unit 44 then caches the destination address and port ID and forwards the packet to the indicated switch port.

Figure 4:
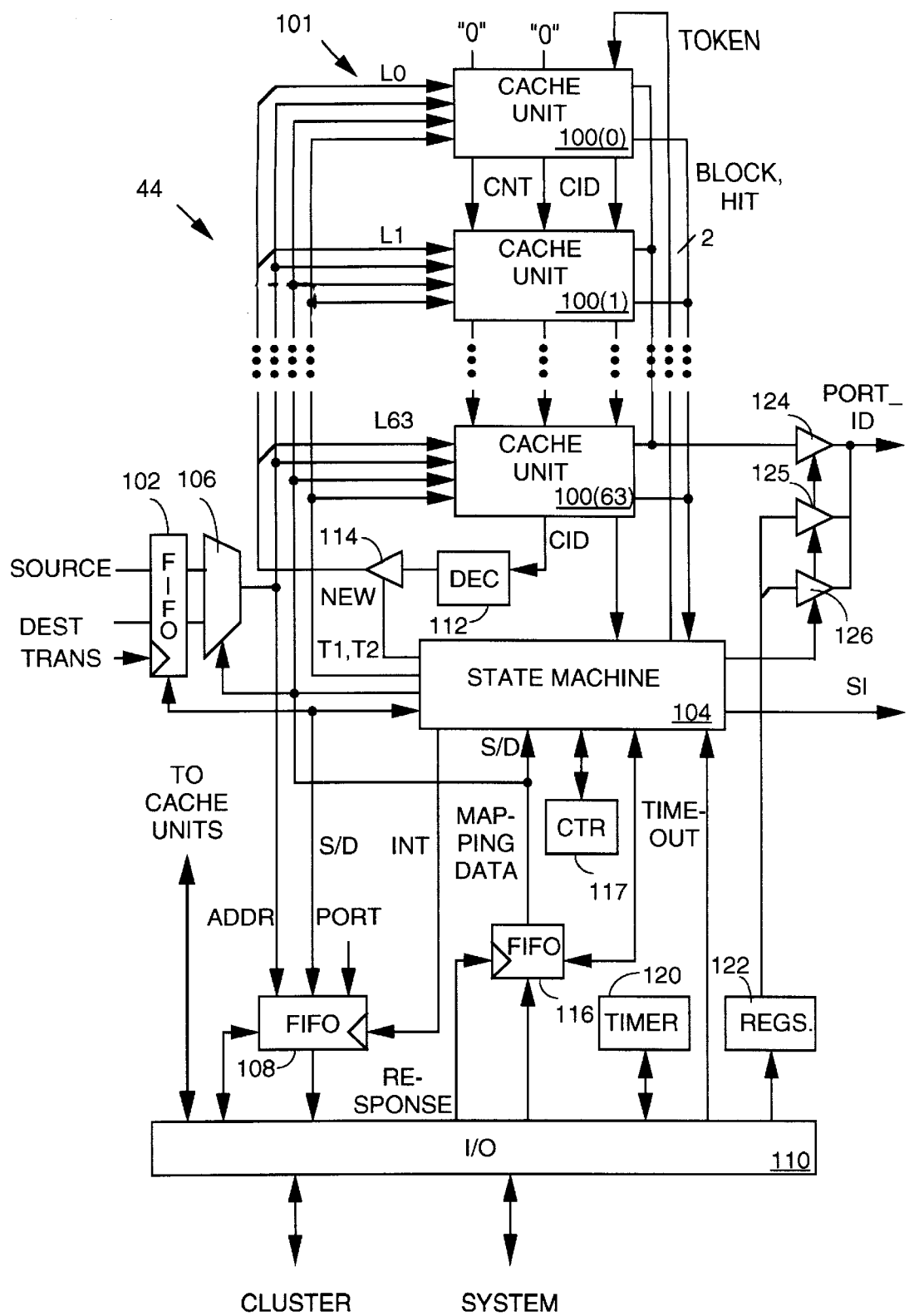
FIG. 4 illustrates the local address translation unit of the input port of FIG. 2 in more detailed block diagram form.
Figure 5:
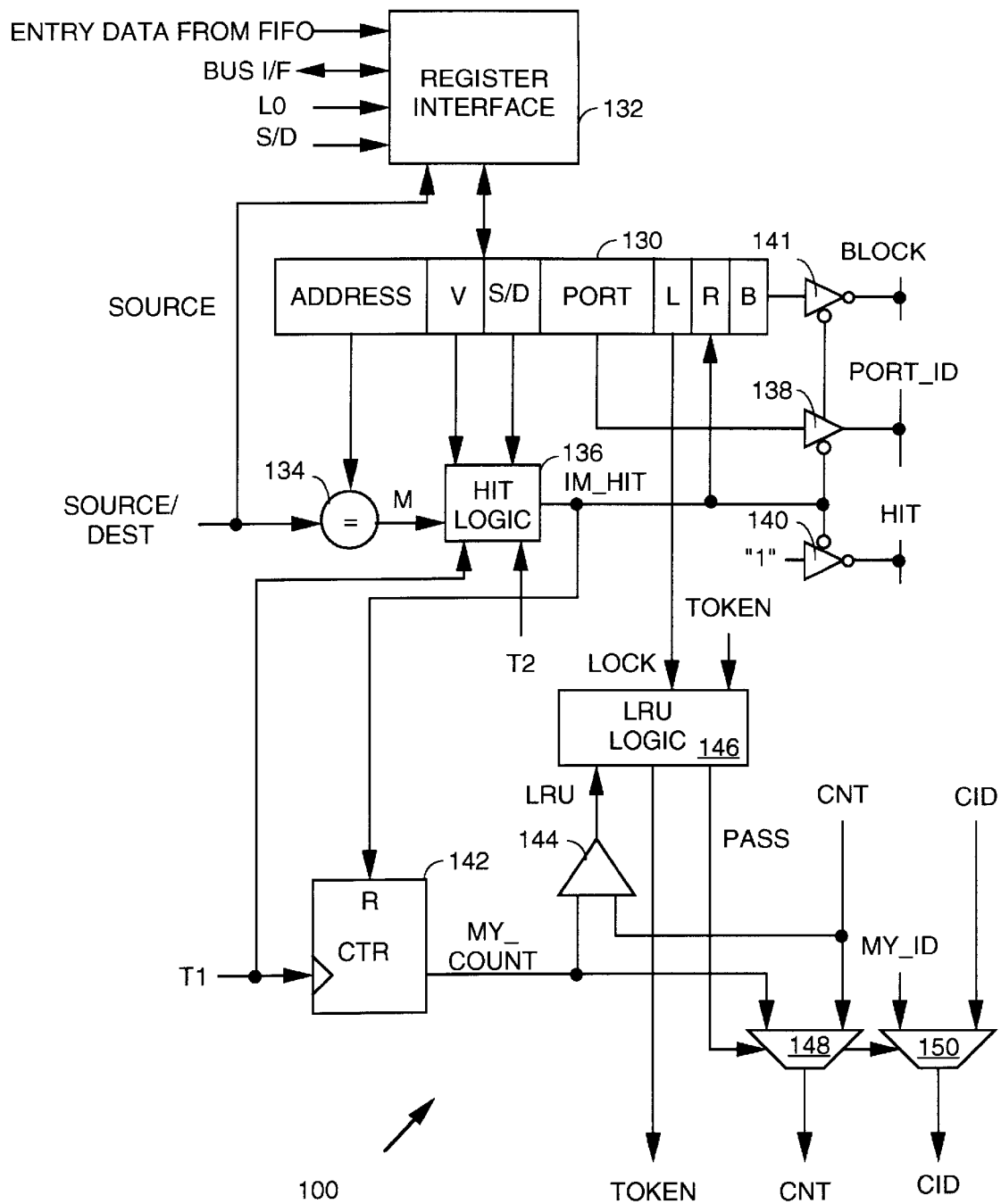
FIG. 5 illustrates a cache unit of the local address translation unit of FIG. 4 in more detailed block diagram form.

Whenever a new network station logs onto the network or change its network address, it may send a packet to itself to announce its existence on the network. This causes the local address translation unit 44 (for example unit 44(0) that receives the packet to send out a translation request which results in an update to the table entries in the secondary translation unit 52(2) and main address translation unit 54 that serve it. Thereafter, when another station sends a packet to that new network address, its local address translation unit 44 (for example unit 52(5) can obtain the destination switch port ID by sending a translation request to the main address translation unit 54 via its secondary address translation unit 52(5). Local Address Translation Unit Referring to FIG. 4, a typical local address translation unit 44 includes a local cache memory 101 implementing a network address/switch port ID look-up table having 64 entries. Cache memory 101 includes a set of 64 cache units 100(0)–100(63), each implementing a separate address translation look-up table entry. FIG. 5 illustrates a typical cache unit 100. Referring to FIGS. 4 and 5, each cache unit 100 includes a set of registers 130 for holding a mapping entry including the data listed in Table II below:

TABLE II

| FIELD | DESCRIPTION | SIZE |
|---|---|---|
| Address | Network Address | 6 bytes |
| V | Valid | 1 bit |
| S/D | Source/Destination | 1 bit |
| Port | Destination Port ID | 5 bits |
| L | Lock bit | 1 bit |
| R | Recent hit bit | 1 bit |
| B | Block bit | 1 bit |

ADDRESS field: The ADDRESS field is the 6 byte source or destination address of a network station.
V bit: The V bit indicates whether the entry is valid. On system startup the V bit in each entry is set to a logical "0" to indicate the entry is invalid. When valid data is loaded into a cache unit, the V bit is set to a "1" to indicate that the entry is now valid.
S/D bit: The S/D bit indicates whether the entry was created for a source or destination network address.
PORT field: The 5-bit PORT field contains the ID of the input or output port to which the destination station identified by the ADDRESS field is connected. The PORT field is not used when the cache unit stores a source address.
LOCK bit: As discussed below, the system manager 28 of FIG. 1 may set the LOCK bit to prevent the data contained in cache unit 100 from being over written. Thus by setting the LOCK bit, the system manager make the look-up table entry permanent.
RECENT bit: The system manager 28 of FIG. 1 may use the RECENT bit to gather network traffic statistics. The local address translation unit 44 sets the RECENT bit whenever an incoming packet source or destination address matches cached source or destination address. The system manager 28 may read or write access the RECENT bit in registers 130 via a system management bus (SYSTEM) and I/O port 110 of local address translation unit 44. When the system manager 28 periodically reads and then resets the RECENT bit, the frequency with which the system manager encounters a set RECENT bit is an indication of the amount of network traffic from or to the source or destination address.

BLOCK bit: Also discussed below, the system manager 28 of FIG. 1 can tell the port whether it is to forward or discard certain packets sent to or from certain network addresses by setting or resetting the BLOCK bit. Thus the system manager may use the BLOCK bit to block network access to or from particular network stations.

Local Translation Unit Operation

Referring to FIG. 4, the local cache is empty on system startup; no cache unit 100 contains a valid source or destination ADDRESS entry matching an incoming SOURCE or DEST address. A TRANS signal pulse from controller 34 of FIG. 2 loads the SOURCE and DEST addresses of a first incoming packet into a FIFO buffer 102 within local address translation unit 44. FIFO buffer 102 signals a state machine 104 when it contains SOURCE and DEST addresses. State machine 104 responds by signaling a multiplexer 106 to deliver the SOURCE address to each cache unit 100. State machine 104 also sends a T1 signal pulse to each cache unit 100.

In response to the T1 signal pulse, each cache unit 100 having a valid source entry compares the incoming SOURCE address to its stored ADDRESS field. If a cache unit 100 storing a source address notes a match between the incoming SOURCE address and its stored source address, the cache unit 100 briefly asserts (pulls down) a HIT line input to state machine 104. If the B (block) bit in the cache unit is set, the cache unit also pulls down a BLOCK line input to state machine 104. A HIT line pulse tells state machine 104 that the secondary address translation unit 52 has already mapped the source address to a port ID. Since in this case, no cache unit 100 stores a valid source address matching the incoming SOURCE address, no unit 100 pulses the HIT line. A BLOCK line pulse tells state machine 104 that the source address is "blocked" and that the packet should not be forwarded.

If state machine 104 does not detect a HIT line pulse in response to its output T1 signal pulse, it knows that the source address is not currently cached. In that case state machine 104 sets an output SID bit to indicate a source address and then pulses an INT signal which loads the SOURCE address and the SID bit into a FIFO buffer 108. FIFO buffer 108 then signals a bus interface circuit 110 to send an interrupt to a secondary address translation unit 52 of FIG. 3. The secondary address translation unit 52 thereafter reads the data out of FIFO buffer 108 and creates a mapping entry relating the shifted out SOURCE address to the port ID.

The cache units 100 and state machine 104 are connected to form a "token passing ring" in which state machine 104 sends a TOKEN signal pulse to first cache unit 100(0), the Nth cache unit 100(N) passes a received TOKEN signal pulse ("passes the token") to cache unit N+1, and the last cache unit 100(63) passes the token back to state machine 104. Each cache unit 100(N) is also connected to the next cache unit 100(N+1) via a set of lines CNT conveying a count to the next cache unit. Each cache unit 100(N) has a unique ID and is also connected to the next cache unit 100(N+1) by another set of lines CID for conveying a cache unit ID to the n ext cache unit. Each cache unit 100 counts the number of T1 signals pulses received and resets its own count whenever it pulses the HIT line. Thus the cache unit 100 with the highest count is the "least recently used" cache unit.

After storing the unmapped SOURCE address in FIFO buffer 108, state machine 104 "passes the token" (pulses its output TOKEN signal) to first cache unit 100(0). When the first cache unit 100(0) receives the token from state machine 104, it transmits its count and its ID number to the second cache unit 100(1) and then passes the token to second cache unit 100(1). When the second cache unit 100(1) receives the token from the first cache unit 100(0), it compares its own count to the incoming count from the first cache unit 100(0). If the second cache unit's count is smaller than the first cache unit's count, the second cache unit forwards the first cache unit's count and ID with the token to the third cache unit 100(3). On the other hand, if the second cache unit's count is greater than or equal to the first cache unit's count, the second cache unit forwards its own count and ID with the token to the third cache unit 100(3).

Each subsequent cache unit 100(N) behaves in a similar manner, passing the token with the count and ID received from the preceding unit to a next unit 100(N+1) when the count received from unit 100(N-1) is larger than its own, and passing the token to the next unit 100(N+1) with its own count and ID when the count received from unit 100(N-1) is smaller than or equal to its own. The last cache unit 100(63) delivers the ID of the cache unit having the largest count (i.e. containing the least recently used mapping entry) to a decoder 112 and passes the token back to state machine 104.

Decoder 112 has 64 outputs L0–L63, each coupled to a corresponding one of cache units 100(0)–100(63) through a set of tristate buffers 114. Decoder 112 asserts one of its outputs L0–L63 corresponding to the cache unit identified by the cache ID (CID) output of cache unit 100(63). State machine 104 responds to the return of the token by briefly turning on buffers 114, one of which thereupon delivering a L0–L63 signal pulse to the cache unit 100 containing the least used entry. The L0–L63 pulse tells the receiving cache unit 100 to replace its currently stored ADDRESS field with the current SOURCE address output of multiplexer 106, to set its V field to indicate the entry is valid, and to set its SID field to indicate the entry is a source address.

The new SOURCE entry having thus replaced the least recently used entry of one of cache units 100, state machine 104 switches multiplexer 106 to pass the DEST field stored in FIFO buffer 102 to the cache units 100 and pulses a T2 signal supplied to all cache units to initiate a destination address translation cycle. Any cache unit 100 storing a destination address field matching the DEST address pulses the HIT line and also, if its B (block) bit is set, pulses the BLOCK line. Since, in this case, no cache unit 100 contains a valid destination address matching the incoming DEST address, no cache unit 100 pulses the HIT line. State machine 104, detecting no HIT line response to its T2 signal pulse, knows that cache units 100 can't translate the DEST field. At this point, state machine 104 again pulses the INT signal, this time causing FIFO buffer 108 to store the DEST address output of multiplexer 106 in FIFO buffer 108 along with the input port ID and the S/D bit from sequencer 104 indicating a destination address translation is requested. State machine 104 also sends a pulse to a counter 117 which keeps track of the number of pending DEST address translations. The pulse tells counter 117 to increase its count by 1. State machine 104, having sent the DEST address to the secondary address translation unit 52 now sends a shift out pulse to FIFO buffer 102 to signal FIFO buffer 102 to supply a next stored SOURCE/DEST address pair, if any, to multiplexer 106. State machine 104 then starts a new address translation cycle. If FIFO buffer 102 is empty, state machine 104 waits until new data arrives in FIFO buffer 102 before initiating another address translation cycle.

When the secondary address translation unit 52 thereafter reads the data out of FIFO buffer 108, it translates the DEST field into a corresponding output port ID and then sends the DEST field, the S/D bit and the output port ID back to bus interface circuit 110 via the CLUSTER bus 52. Interface circuit 110 pulses a RESPONSE signal to store the returned data in another FIFO buffer 116. FIFO buffer 116 thereafter signals state machine 104 that it is not empty. State machine 104 responds by again passing the token to the first cache unit 100(0). The cache units 100 then operate as described herein above to deliver a cash unit ID (CID) to decoder 112, the ID identifying the cache unit containing the least recently used mapping entry. When the token returns to state machine 104, state machine 104 again momentarily turns buffers 114 to deliver a pulse on one of lines L0–L63. The pulse causes the cache unit 100 containing the least recently used mapping entry to replace that entry with the mapping data stored in FIFO buffer 116, That cache unit 100 also passes the newly stored output port ID to the PORT_ID line and pulls down the HIT line. If its B (block) bit is set, the cache unit 100 also pulls down the BLOCK line. In response to a HIT pulse, in the absence of a BLOCK pulse, state machine 104 activates a tri-state buffer 124 and pulses the SI line to shift PORT_ID into arbitration unit 46 of FIG. 2, sends an SO signal to FIFO buffer 116 to shift the old mapping data out of FIFO buffer 116, and signals counter 117 to reduce its pending DEST address translation count by one.

If state machine 104 receives a BLOCK pulse with the HIT pulse or has previously received a BLOCK pulse from the cache unit storing the source address, it responds to the HIT pulse by activating a tristate buffer 125 instead of buffer 124, thereby sending to arbitration unit 46 (FIG. 2) a port ID stored in one of a pair of registers 122 instead of the port ID generated by the cache units 100. On system startup, system manager 28 (FIG. 1) stores a NULL port ID in that register 122. The NULL port ID tells the arbitration controller 22 (FIG. 1) that the packet is to be discarded. In that case, arbitration controller 22 does not connect the requesting input port to an output port before granting the request. When the input port subsequently forwards the "blocked" packet, the packet goes nowhere and is therefore discarded.

Suppose one cache unit 100 already contains an entry storing an ADDRESS field matching the SOURCE address of the incoming packet and another cache unit 100 already contains a valid entry mapping the DEST address to an output port. In response to the TRANS pulse, state machine 104 sends a T1 signal pulse to each cache unit 100. In response to the T1 signal pulse, the particular cache unit 100 currently storing an ADDRESS field matching the incoming SOURCE address immediately pulses the HIT line. The HIT line pulse tells state machine 104 that the SOURCE address is already mapped by one of the cache units 100 (and by the secondary address translation unit 52) and that no further action is required with respect to the incoming SOURCE address.

State machine 104 then switches multiplexer 106 to send its DEST address input to all cache units 100 and then sends a T2 signal pulse to all cache units 100. The cache unit 100 storing a valid ADDRESS field matching the incoming DEST address places its stored PORT field on the PORT_ID lines and pulses the HIT line. State machine 104 responds to the HIT line pulse by checking an output signal of counter 117 asserted when the number of pending address translations is greater than 0.

Translation unit 44 must produce output port ID's on the PORT_ID lines in the same order as it is presented with corresponding DEST addresses. Therefore state machine 104 delays sending out a port ID provided by one of cache units 100 in response to the current incoming DEST field until all pending DEST translations have been processed and the resulting port IDs forwarded to arbitration unit 46 of FIG. 2. If the output signal of counter 117 indicates that there are no pending DEST address translations, state machine 104 responds to the HIT signal by pulsing the SI line to shift the port ID currently on the PORT_ID lines into arbitration unit 46 of FIG. 2. It then shifts the old SOURCE/DEST data out of FIFO buffer 102 and awaits arrival of another SOURCE/DEST address pair in FIFO buffer 102.

However, if the output signal of counter 117 indicates that there are pending DEST address translations, state machine 104 does not pulse the SI after a cache unit 100 places a destination port ID on the PORT_ID lines and pulses the HIT signal. Instead, state machine 104 turns off its T2 signal output and continues to process the pending DEST address translations as they arrive in FIFO buffer 116 by storing mapping entries in cache memory and sending the arriving destination port IDs outward on the PORT_ID lines. When the output of counter 117 indicates that all pending DEST address translations have been processed, with multiplexer 106 still passing the DEST address to the cache units 100, state machine 104 again pulses the T2 signal. If the cache unit 100 still maps the DEST address to a port ID, it again places the port ID on the PORT_ID lines and asserts the HIT signal. State machine 104 responds by pulsing the SI line to shift the port ID on the PORT_ID lines into arbitration unit 46 of FIG. 2, shifting the last processed SOURCE and DEST address out of FIFO buffer 106, and initiating a new translation process if FIFO buffer 102 is not empty. If a cache unit 100 no longer maps the incoming DEST address to a port ID, the hit line is not asserted and state machine 104 instead sends the DEST address to the secondary address translation unit 52 in the manner described herein above.

Late Address Translation

When interface circuit 110 sends an address translation request to the secondary address translation unit 52 of FIG. 3 via the CLUSTER bus, it starts a count down timer 120. If the address translation is not returned before interface circuit 110 timer 120 counts out, interface circuit 110 sends a TIMEOUT signal pulse to state machine 104. State machine 104 responds by enabling a tri-state buffer 126 which sends a port ID stored in one of registers 122 outward to arbitration unit 46 (FIG. 2) as the destination PORT_ID. State machine 104 then asserts the SI signal and decrements counter 117. The SI signal pulse loads the port ID from that register 122 into arbitration unit 46 of FIG. 2.

The system manager 28 writes a port ID in that particular one of registers 122 on system start up. The value of the port ID depends on the policy the system uses for handling an unroutable packet. If the unroutable packet is to be discarded, the port ID stored in register 112 refers to a nonexistent "NULL" switch port. If the unroutable packet is to be sent to the system manager, the port ID stored in register 122 refers to a switch port to which the system manager is connected. This allows the system manager to look at the unroutable packet and make some determination as to what to do with it. Another way of handling an unroutable packet is to send it to every network destination station. To implement this policy the port ID stored in register 122 should contain a "broadcast" switch port ID. In response to a request for transmission to the broadcast switch port, arbitration controller 22 of FIG. 1 sets switch 12 so that it forwards the packet to all switch output ports so that every network station receives the packet. Though all network stations receive the packet, only the network station to which the packet is addressed will accept the packet. The other network stations will discard it.

Cache Unit

FIG. 5 illustrates a cache unit 100 of FIG. 4 in more detailed block diagram form. The other cache units 100 are similar. Each cache unit 100 implements a separate entry of the local address translation unit look-up table. As shown in FIG. 5, a typical cache unit 100 includes registers 130 for storing various components of the mapping entry. A register interface circuit 132 communicates with bus interface circuit 110 (FIG. 5) and allows the bus interface circuit to read and write access registers 130. Register interface circuit 132 also receives the returned DEST address and port ID from FIFO buffer 116 (FIG. 5) and stores them in registers 130 in response to the LOAD_1 signal from buffer 114 (FIG. 5) when the SID bit is sent to indicate a destination address mapping entry is to be saved. Register interface circuit 132 also receives the SOURCE address from ultiplexer 106 (FIG. 5) and stores it in registers 130 in response to a pulse of the LOAD_1 signal when the SID signal from state machine 104 (FIG. 5) indicates the SOURCE address is to be saved. On system startup register interface circuit 132 sets a valid bit V in registers 130 to a logical "0" indicating that the entry is not valid. Thereafter, when valid data is loaded into registers 130, register interface circuit 132 sets the V bit to a logical "1". Also when register interface circuit 132 writes a SOURCE or DEST entry into registers 130 it sets the SID bit to a "0" or a "1" to indicate whether register contains a SOURCE or DEST address.

A comparator 134 asserts an output "match" signal M whenever the ADDRESS field in registers 130 matches an incoming SOURCE or DEST address from multiplexer 106 of FIG. 5. The M signal, the T1 and T2 signal pulses from state machine 104 (FIG. 5), and the V and S/D bits in registers 130 are all supplied to a hit logic circuit 136. Logic circuit 136 produces an output signal IM_HIT in accordance with truth TABLE III.

TABLE III

| V | S/D | T1 | T2 | M | IM_HIT |
|---|-----|----|----|---|--------|
| 1 | 0 | 1 | 0 | 1 | 1 |
| 1 | 1 | 0 | 1 | 1 | 1 |
| 0 | X | X | X | X | 0 |
| X | X | X | X | 0 | 0 |

In the above table a "1" indicates the signal is asserted, a "0" indicates the signal is not asserted and an "X" indicates the signal may be either asserted or not asserted. When IM_HIT is a logical "1" it turns on a set of tristate buffers 138, 140 and 141. Buffer 138 places the PORT ID in registers 130 on the PORT_ID lines. Buffer 140 pulls down (asserts) the HIT line. If the B (block) bit in registers 130 is set, tri-state buffer 141 pulls down the BLOCK line.

Cache unit 100 also includes a counter 142 incremented on each pulse of the T1 signal and reset on each pulse of the IM_HIT signal. Counter 142 keeps track of the number of times the ADDRESS stored in registers 130 fails to match either the incoming SOURCE or DEST field and produces an output count MY_COUNT. When MY_COUNT reaches the counter's upper limit, the count remains at the upper limit until reset. A comparator 144 compares MY_COUNT to the incoming count CNT from the preceding cache unit and produces an output signal LRU when CNT is less than or equal to MY_COUNT. The input TOKEN signal, the LRU signal and the LOCK signal (from decoder 122 FIG. 5) provide inputs to another logic circuit 146. Logic circuit 146 produces an output signal PASS controlling a pair of multiplexers 148 and 150. Multiplexer 148 supplies the count data to the next cache unit on the CNT lines by selecting either the count data on the CNT lines from the preceding cache unit or the MY_COUNT out of counter 142. Multiplexer 150 passes a cache unit ID on the CID lines to the next cache unit by selecting either the ID on the CID lines from the preceding cache unit or its own hardwired ID (MY_ID). When logic circuit 146 asserts PASS, multiplexers 148 and 150 pass MY_COUNT and MY_ID. Table IV indicates the logic performed by logic circuit 146.

TABLE IV

| TOKEN LOCK (IN) | LRU | TOKEN PASS (OUT) | | |
|---|---|---|---|---|
| 0 | X | X | 0 | 0 |
| 1 | 0 | 1 | 1 | 1 |
| 1 | 0 | 0 | 1 | 0 |
| 1 | 1 | X | 1 | 0 |

The LRU logic circuit 146 suitably delays pulsing its output TOKEN signal so that it does not pass the token before multiplexers 148 and 150 have had time to switch in response to a change of state of the PASS signal.

Local Translation Unit State Machine Logic

Figures 6, 7, 8:
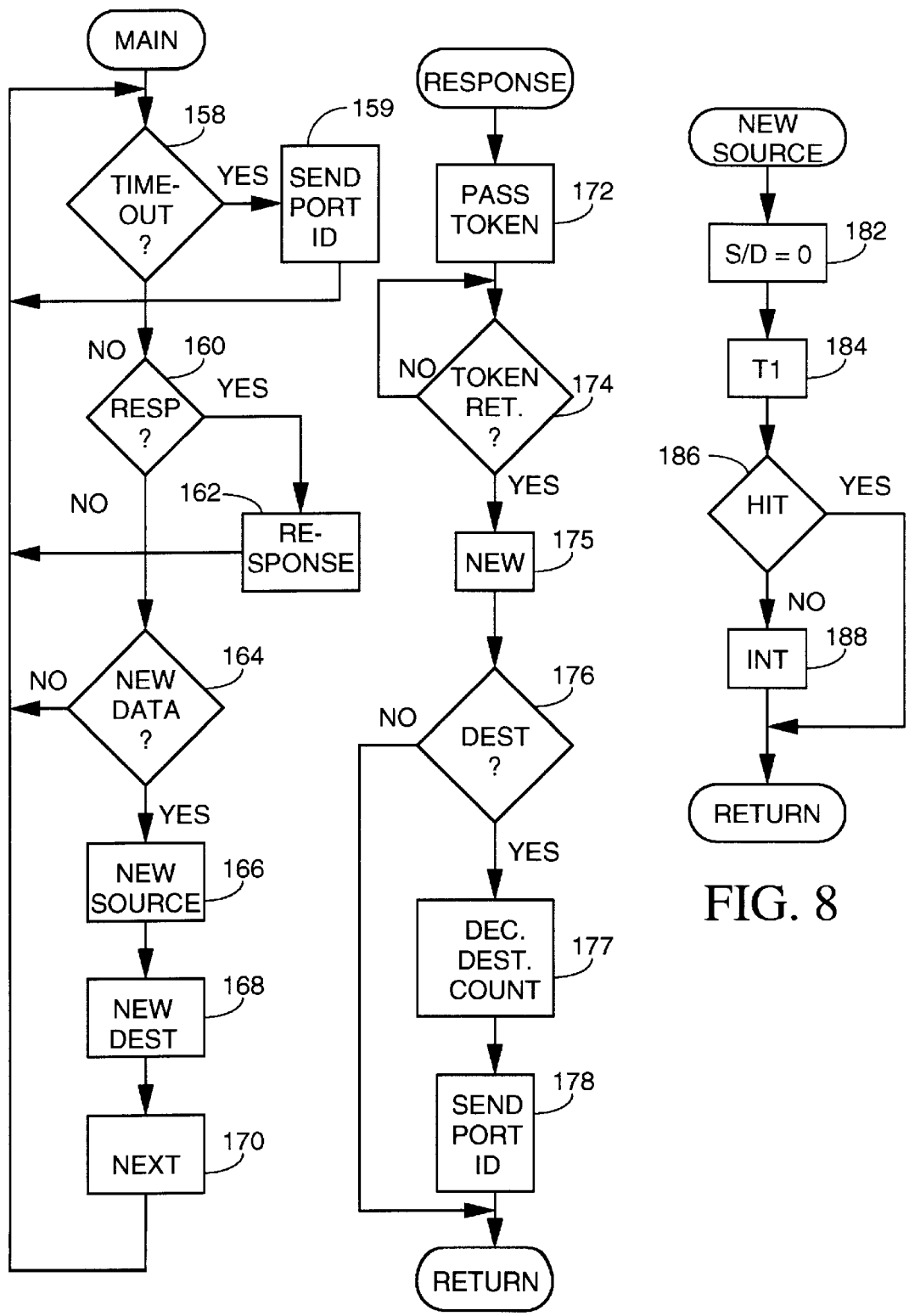
FIGS. 6–10 are flow charts illustrating operation of components of the clustered address caching system in accordance with the present invention.

FIG. 6 is a flow chart illustrating a main routine executed by state machine 104 of FIG. 5 following system startup. Beginning at step 158 state machine 104 checks whether I/O port 110 is asserting the TIMEOUT signal. If so state machine 104 executes a SEND PORT ID subroutine (step 159) to send a NULL, broadcast, or management port ID from registers 122 to arbitration unit 46 of FIG. 2.

After step 158 (if there is no TIMEOUT signal), state machine 104 checks FIFO buffer 116 to see if it contains a translation response from the secondary translation unit 26 (step 160). If FIFO buffer 116 contains a response, state machine 104 updates the address translation unit by writing the destination mapping data in the response from FIFO buffer 116 into one of cache units 100 and sending the returned port ID out on the PORT_ID line (step 162). (Step 162 is detailed herein below). State machine 104 cycles through steps 158–162 until at step 160 it finds FIFO buffer 116 is empty. It then checks FIFO buffer 102 (FIG. 4) to determine if it contains new address translation data (step 164). If not, state machine 104 returns to step 160. If FIFO buffer 102 is not empty, state machine 104 processes the new SOURCE address in FIFO buffer 102 (step 166) and then processes the new DEST address in FIFO buffer 102 (step 168). (Steps 166 and 168 are detailed herein below.) After processing the new SOURCE and DEST addresses, state machine 102 transmits a NEXT signal to FIFO buffer 102 to shift out the last processed SOURCE and DEST addresses (step 170) and then returns to step 158.

FIG. 7 illustrates the RET. DEST subroutine executed at step 162 of FIG. 6 when state machine 104 detects that FIFO buffer 116 stores a response to an address translation request returned by the secondary address translation unit. Referring to FIGS. 5 and 8, state machine 104 initially passes the token to cache unit 100(0) (step 172) and then waits unit cache unit 100(63) returns the token (step 174). It then transmits a NEW signal pulse to buffers 114 to write the destination address translation data in FIFO buffer 116 into the least recently used cache unit 100 (step 176) and decrements the destination address translation count in counter 117 of FIG. 1 (step 177). As the cache unit 100 receiving the data outputs the cached port ID, state machine 104 executes a SEND PORT ID routine to send the cached port ID to arbitration buffer 46 of FIG. 2 (step 178).

FIG. 8 illustrates the NEW SOURCE subroutine called at step 166 of the main routine of FIG. 6. Referring to FIGS. 5 and 8, state machine 104 initially sets the S/D bit to "0" to cause multiplexer 106 to select the current SOURCE address output of FIFO buffer 102 (step 182) and asserts the T1 signal (step 184). If one of the cache units 100 contains an entry matching the incoming SOURCE address, it asserts the HIT line. If state machine 104 detects the HIT line assertion (step 186) the subroutine ends. However if no cache unit 100 contains an entry matching the SOURCE address, state machine 104 pulses the INT signal (step 188) to send the SOURCE address mapping data into FIFO buffer 108 to be forwarded to the central translation unit 26. State machine 104 then passes the token to cache unit 100(0) (step 190) and waits until the token returns (step 192). At that point it sends a NEW signal pulse to buffers 114 causing the cache unit 100 storing the least recently used entry to store the new SOURCE address (step 194). The routine then returns to the main routine.

Figures 9, 10:
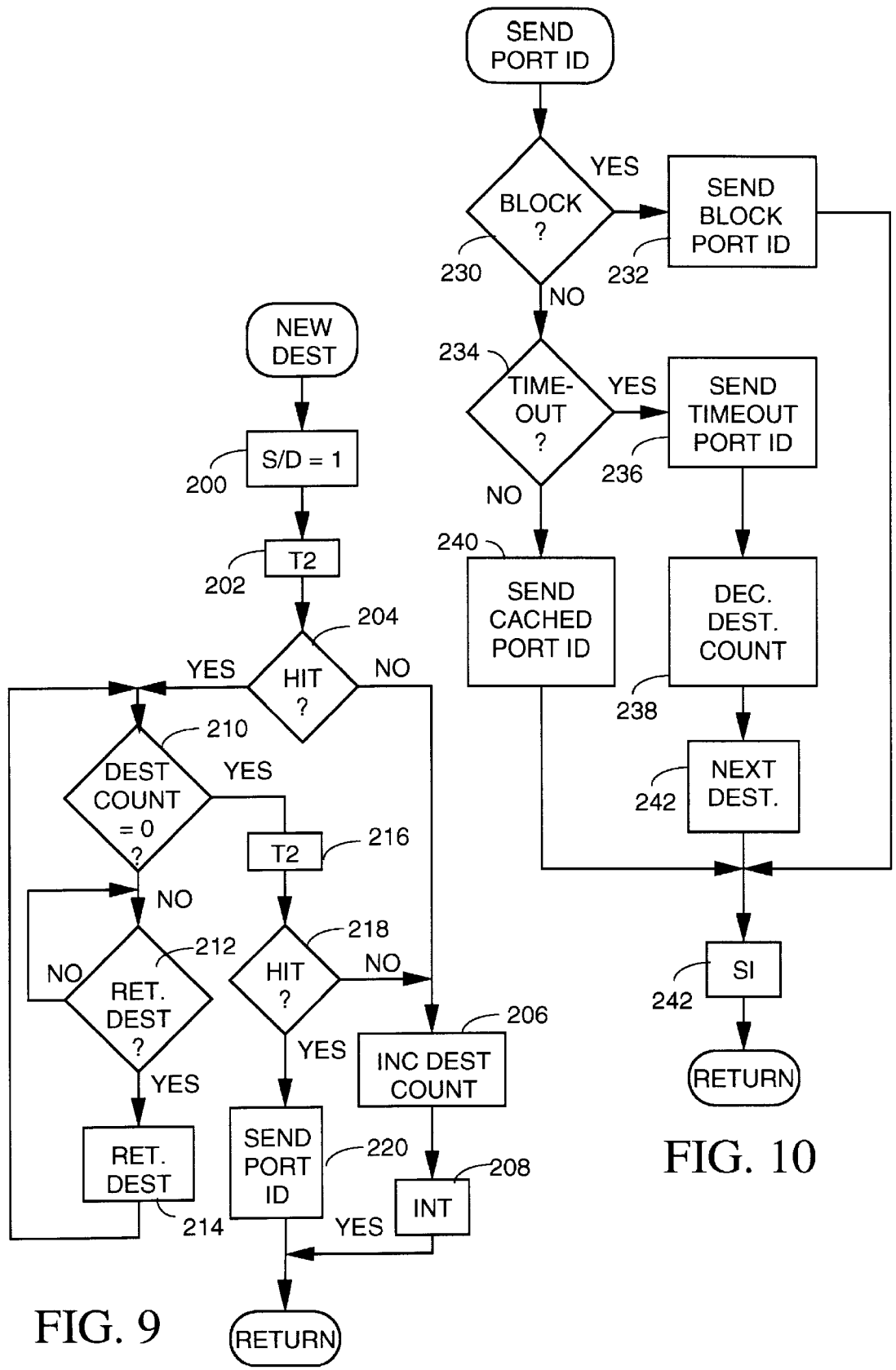

FIG. 9 illustrates the NEW DEST subroutine called at step 168 of the main routine of FIG. 6. Referring to FIGS. 5 and 9, state machine 104 initially sets the S/D bit to a "1" causing multiplexer 106 to pass the DEST address output of FIFO buffer 102 to the cache units 100 (step 200). State machine 104 then pulses the T2 signal (step 202) and checks the HIT line (step 204). If none of the cache units asserts the HIT line, state machine 104 signals counter 117 to increase its count by one (step 206) and pulses the INT signal to load the DEST address translation data into FIFO buffer 108 to be forwarded to the central translation unit 26. The subroutine then returns to the main routine. However if one of the cache units asserts the HIT line at step 204, state machine 104 checks the output of counter 117 (step 210). State machine 104 then waits until an output signal of FIFO buffer 116 indicates the central translation unit has returned destination address translation data (step 212). At that point state machine 104 executes the RET DEST subroutine of FIG. 7 to write the translation data output of FIFO buffer 116 into the least recently used cache unit 100 (step 214). State machine 104 continues to cycle through steps 210, 212 and 214 until the count maintained by counter 117 reaches zero, indicating that all pending destination address translations have been written into the cache units 100. At that point, state machine 104 pulses the T2 signal (step 216) and checks the HIT line again (step 218). If the cache unit 100 previously mapping the incoming DEST address no longer does so, the HIT line will not be asserted at step 218. Instead state machine 104 executes steps 206 and 208 to send an address translation request to the secondary address translation. The subroutine then returns to the main routine. However if one of the cache units still contains an entry matching the incoming DEST address from multiplexer 106, the cache unit places the port ID on the PORT_ID lines and asserts the HIT line. State machine 104 responds by executing the SEND PORT ID routine (step 220). The subroutine then returns.

FIG. 10 illustrates the SEND PORT ID subroutine called at steps 159, 178 and 220 of FIGS. 6, 7 and 9. If the BLOCK signal is asserted (step 230), state machine 104 enables buffer 124 of FIG. 4 to send a NULL or other appropriate port ID stored in one of registers 122 to the arbitration unit 46 of FIG. 46 (step 232) If the TIMEOUT signal is asserted (step 234), state machine 104 enables buffer 125 of FIG. 4 to send a NULL or other appropriate port ID stored in the other register 122 to the arbitration unit 46 of FIG. 46 (step 236). It then decrements the destination address count in counter 117 of FIG. 2 (step 238). If it detects no BLOCK or TIMEOUT signal state machine 104 enables buffer 124 of FIG. 2 to send a cached port ID supplied by one of cache units 100 to the arbitration unit (step 240). After enabling one of buffers 124–126, state machine 104 and sends an SI signal pulse to arbitration unit 46 of FIG. 2. The subroutine then returns to its calling routine.

Secondary Address Translation Unit

Figure 11:
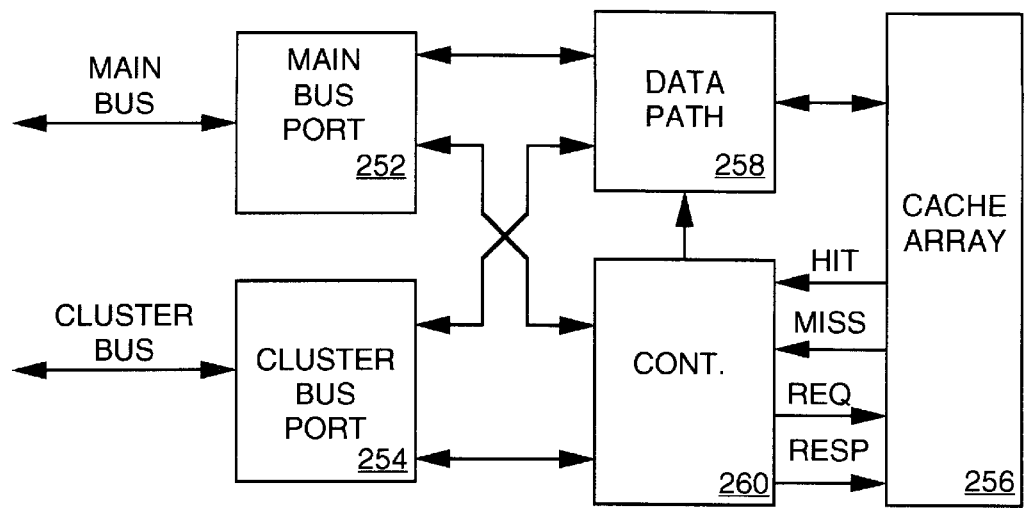
FIG. 11 illustrates a typical secondary address translation unit of FIG. 3 in more detailed block diagram form.

FIG. 11 illustrates a typical secondary address translation (SAT) unit 52 of FIG. 3 in more detailed block diagram form. SAT unit 52 includes a conventional bus port 252 providing an interface to the MAIN bus and a conventional bus port 254 providing an interface to the CLUSTER bus. A cache array 256 stores address translation data. A data router 258 conveys data between ports 252 and 254 and cache array 256. A controller 260 controls the flow of data through data router 258.

When local address translation unit 44 FIG. 4 has no entry for the source and/or destination address of an incoming data packet it places the unmapped address and its own input port ID in FIFO buffer 108 along with the S/D bit indicating whether each address is a source or destination address. Each entry in FIFO buffer 108 is a separate mapping request including an address, the requesting port's ID and an S/D bit indicating whether the address is a source or destination address. When the FIFO buffer 108 contains one or more mapping requests, the local address translation unit 44 transmits an interrupt to CLUSTER bus port 254 of FIG. 11. CLUSTER bus port 254 then reads all mapping requests out of FIFO buffer 108 via the CLUSTER bus, stores them in its own internal FIFO buffer and then signals controller 260. Controller 260 then configures data router 258 to convey a mapping request from cluster bus port 254 to cache array 256 and signals cluster bus port to send the first mapping request to the cache array. Controller 260 pulses a REQ input to cache array 266 to load the first request into a FIFO buffer in the cache array.

If cache array 256 has an entry for an address included in an incoming mapping request, it supplies the mapping data contained in that entry as a response to data router 258 and sends a HIT signal pulse to controller 260. Controller 260 then signals the data router 258 to send the response back to CLUSTER bus port 254 and signals the CLUSTER bus port 254 to write the response into a FIFO buffer 116 of the local address translation unit 44 (FIG. 4) that sent the request. The local address translation unit 44 then writes the mapping data contained in the response into its local cache in the manner described above. The process is repeated for each mapping request stored in CLUSTER bus port 284.

If cache array 256 does not have an entry for the source or destination address included in a mapping request, or if the port ID in the entry does not match the port ID included in a mapping request for a source address (i.e. the source network station has moved to a new switch port) cache array 256 sends a "MISS" signal pulse to controller 260. Controller 260 then switches data path 258 to pass the mapping request from the CLUSTER bus port 254 to MAIN bus port 252 and signals MAIN bus port 252 to send the mapping request to main address translation unit 54 of FIG. 3. The MAIN bus port 252 then asserts an interrupt to the main address translation unit 54 over the MAIN bus.

The main address translation unit 54 of FIG. 3 responds to the interrupt by acquiring the mapping request from MAIN bus port 252. The main address translation unit 54 maintains an entry for every known network address. On receiving the mapping request, the main translation unit 54 looks for an entry for that network address included in the mapping request. If it has no entry for a source address included in the request, it creates one. If it has an entry for the source address, main translation unit 54 updates the port ID in the entry if necessary to match the incoming port ID. If it has no entry for a destination address included in the request, the main translation unit 54 sends an error message to the system manager 28 (FIG. 1) via the SYSTEM bus and takes no further action.

In addition to a network address and port ID, each mapping entry in main address translation unit 54 of FIG. 3 includes the previously mentioned LOCK and BLOCK bits. The main address translation unit 54 sets these bits false when it creates an entry, but system manager 28 of FIG. 1, which has access to main address translation unit 54 via the SYSTEM bus, may subsequently change the states of those bits by writing them into the entry.

After locating, creating or updating a mapping entry in response to an incoming mapping request, main address translation unit 54 returns the mapping data included in the entry as a mapping response via the MAIN bus to a FIFO buffer within MAIN bus port 252 of secondary address translation unit 52. When its FIFO buffer in not empty, MAIN bus port 252 signals controller 260. Controller 260 then switches data router 258 to pass a response stored in MAIN bus port 252 concurrently to cache array 256 and to a FIFO buffer in CLUSTER bus port 254. Controller 260 transmits a RESP signal pulse to cache array 266 causing the cache array to accept the response and to create or update an entry for the mapping data included in the response. Controller 260 also signals CLUSTER bus port 254 to forward the response to the local address translation unit 44 (FIG. 3) that originally sent the mapping request. The local address translation unit 44 then creates a new cache entry for the mapping data. As discussed above, if secondary address translation unit 44 is unable to respond to a request for translating a destination address within a set amount of time, the input port that sent the request either broadcasts the packet, discards, or sends it to the system manager. Otherwise, the input port forwards the packet to the destination output port identified in the response.

Secondary Address Translation Cache Array

Figure 12:
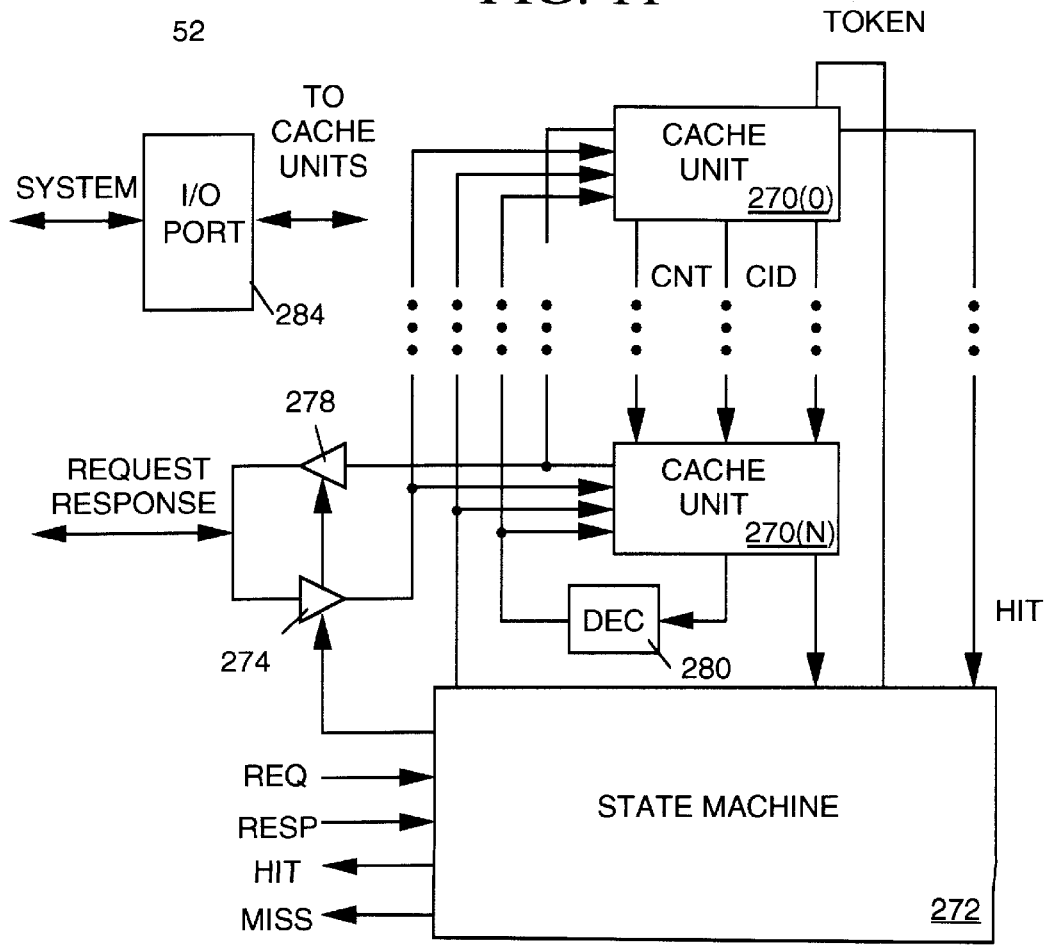
FIG. 12 illustrates the cache array of FIG. 11 in more detailed block diagram form.
Figure 13:
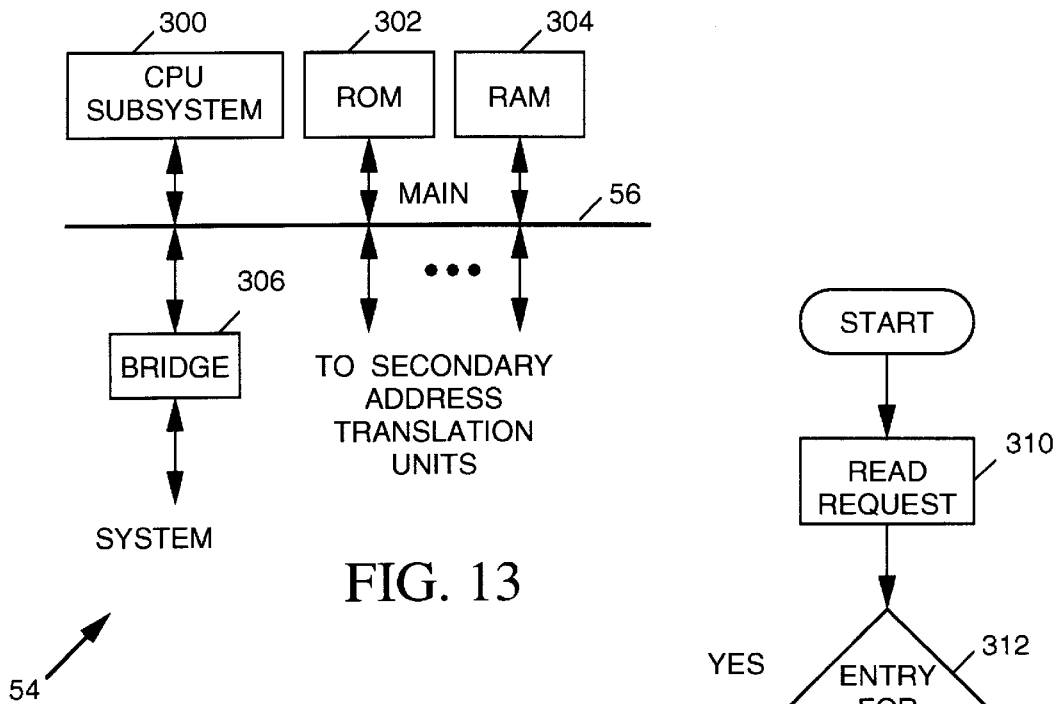
FIG. 13 illustrates the main address translation unit of FIG. 3 in more detailed block diagram form.

FIG. 12 illustrates cache array 256 of the secondary address translation unit 52 of FIG. 11 in more detailed block diagram form. The operation of secondary address translation unit 52 of FIG. 13 is somewhat similar to that of local address translation unit 44 of FIG. 4. Secondary address translation unit 52 includes a set of N+1 cache units 270 that are generally similar to cache units 100 of local address translation unit 44. An incoming REQ pulse tells a state machine 272 to activate a buffer 274 which delivers the incoming request to all cache units 270. State machine 272 then sends a TOKEN signal pulse to cache unit 270(0). As the TOKEN signal pulse passes to each cache unit 270 in turn, any cache unit 270 having an entry matching the address in the request sends a HIT signal to state machine 272 and sends the contents of the entry (the response) to a buffer 278. State machine 272 responds to the HIT pulse by enabling buffer 278 and sending a HIT signal to controller 260 of FIG. 11. If the TOKEN signal returns to state machine 270 without any of the cache units 270 signaling a HIT, state machine 272 asserts a MISS signal to controller 260 of FIG. 11.

A RESP signal from controller 260 of FIG. 11 tells state machine 272 to enable buffer 274 to send the response to each cache unit 270. State machine also sends a TOKEN signal out to the cache units 270, the least recently used (LRU) cache unit 270 puts its ID on a CID line to a decoder 280 which decodes the ID and signals the LRU cache unit. A LOAD signal from state machine 272 tells the LRU cache unit to store the mapping data included in the response, writing over any mapping data previously stored therein.

A SYSTEM bus I/O port 284 provides system manager 28 of FIG. 1 with read and write access to the mapping data stored in each cache unit 270 in the same manner, and for the same reasons, that port 110 of FIG. 4 allows the system manager 28 to access cache units 100 of FIG. 4.

MAIN ADDRESS TRANSLATION UNIT

FIG. 13 illustrates main address translation unit 54 of FIG. 3 in more detailed block diagram form. Unit 54 is a conventional computer including a processor 300, a read only memory (ROM) 302 for storing program instructions, and a random access memory (RAM) 304 for storing an address translation database, all interconnected by the MAIN bus. The main address translation unit 54 also includes a conventional bridge 306 for linking the SYSTEM bus to the MAIN bus 56 so that system manager 28 (FIG. 1) and processor 300 can communicate with each other.

Figure 14:
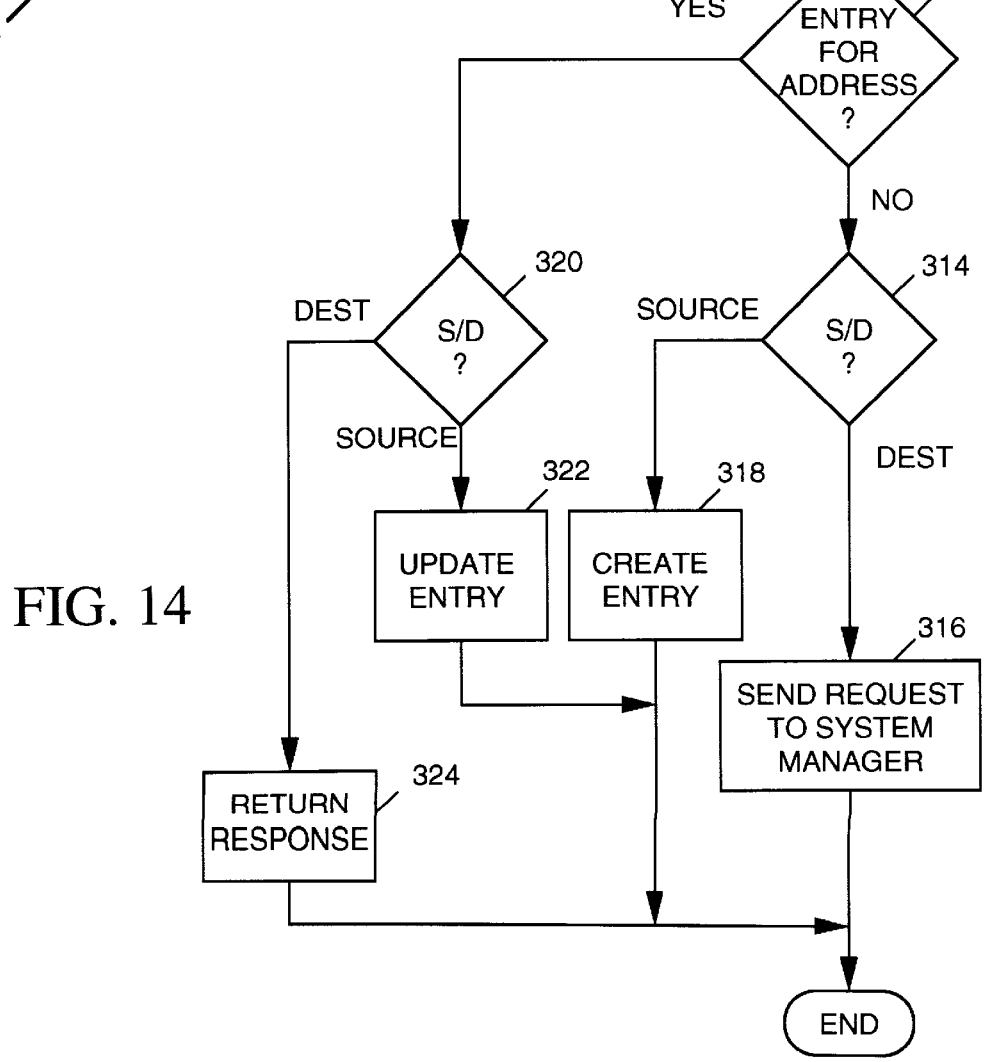
FIG. 14 is a flow chart illustrating operation of the main address translation unit of FIG. 13.

FIG. 14 is a flow chart illustrating a routine implemented by CPU 300 when responding to an interrupt from a secondary address translation unit 52 of FIG. 3 In response to an interrupt, CPU 300 reads the request out of MAIN bus port of the secondary address translation unit 52 that sent the interrupt (310). CPU 300 then checks its address translation database to determine if contains an entry for the address included in the request (step 312). If it does not contain an entry for that address, CUP 300 determines from the S/D bit in the request whether the request is for a source or destination address (step 314). Normally the data base will contain an entry for a destination address; an unmapped destination address is an error. In such case CPU 300 simply forwards the request to the system manager 28 of FIG. 1 (step 316) and takes no further action. The system manager 28 may, for example, generate an error message to the system administrator.

If an unmapped address is a source address (step 314) CPU 300 creates a new entry in its data base to contain the mapping information contained in the request (step 318). The routine then terminates. However if the address in the request is mapped (step 312), and if the S/D bit indicates that it is a source address (step 320), then CPU 300 updates the translation data base entry, if necessary, so that the port ID contained therein matches the port ID conveyed in the request (step 322). The routine then terminates. If a mapped address is a destination address (step 320), CPU 300 reads the mapping information out of its database and returns a response conveying that mapping information back to the to the requesting secondary address translation unit (step 324).

SYSTEM EXPANSION

Figure 15:
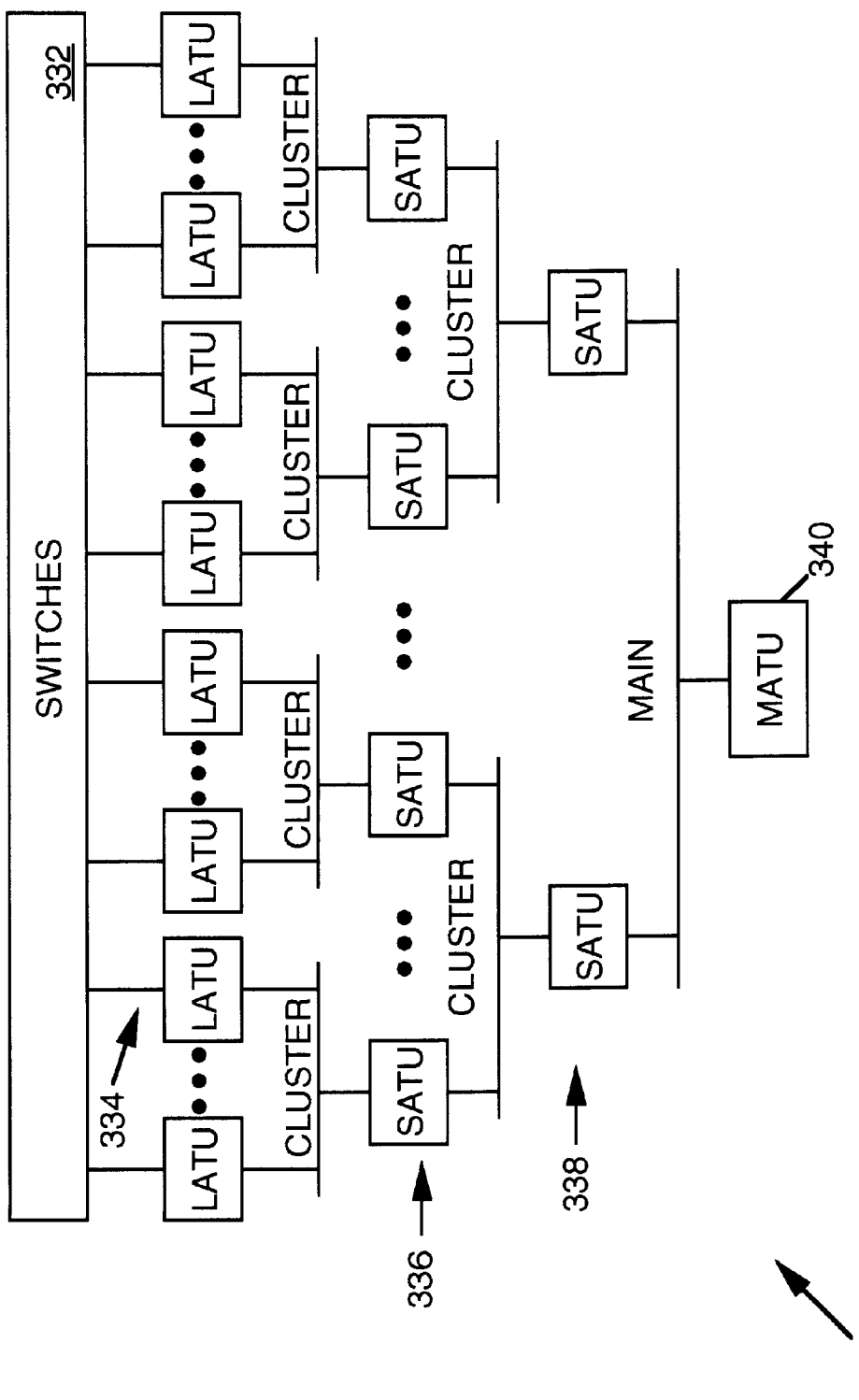
FIG. 15 is a block diagram illustrating a multi-level clustered address translation system in accordance with the present invention.

The clustered address caching system as illustrated in FIG. 3 has three address caching levels: local, secondary and main. FIG. 15 is a block diagram illustrating an expanded version 328 clustered address caching system 26 of FIG. 3 for accommodating a larger network of switches 330. Here address caching system 330 has two levels of secondary address translation units 336 and 338 between the main address translation unit (MATU) 340 and the local address translation units 334 within the input ports servicing switches 332. Secondary address translation units 336 are identical to secondary address translation units 52 of FIG. 3 and behave in a similar manner. A first level secondary address translation unit 336 of FIG. 15 communicates with a second level secondary address translation unit 338 in the same manner that secondary address translation unit 52 of FIG. 2 communicates with main address translation unit 54.

The secondary address translation units can be thought of as building blocks for a clustered address translation system of arbitrary dimension. The system can also be further expanded vertically by providing more secondary address translation unit levels between the local address translation units and the main address translation. It should be apparent that the address translation system can be further horizontally expanded by placing more local address translation units on each CLUSTER bus, or more secondary address translation units on each CLUSTER or main bus. An optimal system arrangement for a given number of local address translation units minimizes translation latency and provides for the most efficient use of CLUSTER and MAIN bus bandwidth. Horizontal expansion increases the traffic through each secondary address translation unit but does not increase the number of secondary address translation unit levels requests and response must traverse. Thus horizontal expansion is preferable when the secondary address translation units are not too busy. However when secondary address translation units are busy, horizontally expansion causes excessive latency within each secondary address translation unit increases. Thus vertical expansion is preferable when secondary address translation unit's are busy.

Thus has been described a clustered address translation system for a local area network. The modularized address translation system can be easily expanded and organized to meet the needs of a changing network.

While the forgoing specification has described preferred embodiment(s) of the present invention, one skilled in the art may make many modifications to the preferred embodiment without departing from the invention in its broader aspects. The appended claims therefore are intended to cover all such modifications as fall within the true scope and spirit of the invention.

What is claimed is:

1. A network switch for forwarding data packets between network stations, each network station having a unique network address, each data packet including a source network address of a source network station sending the packet and a destination network address of a destination network station to receive the packet, the network switch comprising:

a plurality of pairs of input and output ports, each pair having a unique port identification (ID), each network station being linked to one pair of said input and output ports for sending data packets to the input port and for receiving data packets from the output port to which the network station is linked, each input port including a local address cache having a plurality of entries, each entry relating a network address to a port ID, wherein each input port upon receiving a data packet from a network station generates an output forwarding request when its local address cache contains an entry relating a network address contained in said data packet to a port ID, and otherwise generates an output address translation request including the network address contained in said data packet, awaits an input address translation response conveying a port ID, and then generates an output forwarding request containing the port ID conveyed in the address translation response;

forwarding means for receiving and responding to a forwarding request generated by any one of said input ports by forwarding a data packet from said any one input port to any one of said output ports identified by a port ID contained in the forwarding request, the output port thereafter forwarding the packet to a network station;

main address translation means for receiving an input address translation request conveying a network address of a network station and for generating in response thereto an output address translation response conveying a port ID of a corresponding input and output port pair to which said network station is linked; and a plurality of secondary address translation means, each including a secondary address cache having a plurality of entries, each secondary address cache entry relating a network address to a port ID, each secondary address translation means being linked to a separate subset of said input ports, for receiving each address translation request generated by each input port of said separate subset, each secondary address translation means, upon receiving and address translation request from an input port, returning to that input port an address translation response when its secondary address cache contains an entry relating a network address contained in said address request to a port ID, and otherwise forwarding said output address translation request to said main address translation means, receiving an address translation response generated by said main address translation means, and then forwarding said address translation response to said input port.

2. The network switch in accordance with claim 1 wherein upon receiving said address translation response, said input port creates a new local address translation cache entry relating a network address to a port ID conveyed in said address translation response.

3. The network switch in accordance with claim 2 wherein said input port creates said new local address translation cache entry by altering one of said plurality of local address translation cache entries.

4. The network switch in accordance with claim 3 wherein said one of said plurality of local address translation cache entries is an entry relating a port ID to a network address least recently contained in a data packet received by said input port.

5. The network switch in accordance with claim 3 wherein each local address cache entry also includes lock data indicating whether said local address cache entry may be altered.

6. The network switch in accordance with claim 3 wherein each local address cache entry also includes block data indicating whether a data packet may be forwarded to an output port identified by a port ID and other information included in the local address cache entry.

7. The network switch in accordance with claim 1 wherein upon receiving said address translation response, said each secondary address translation means creates a secondary address translation cache entry relating a network address to a port ID conveyed in said address translation response.

8. The network switch in accordance with claim 1 further comprising:

a plurality of cluster buses, each cluster bus linking a separate one of said secondary address translation means in parallel to a separate subset of said input ports, for conveying address translation requests from said subset of input ports to the secondary address translation means and for conveying address translation responses from the secondary address translation means to said subset of input ports; and a main bus for linking said plurality of secondary addresses translation means in parallel to said main address translation means for conveying address translation requests from said secondary address translation means to said main address translation means and for conveying address translation responses from said main address translation means to said secondary address translation means.

9. The network switch in accordance with claim 8 wherein each secondary address translation means comprises:

said secondary address translation cache;

a cluster bus port for receiving input address translation requests from said input ports, for forwarding output address translation responses to said input port via said cluster bus, and for generating a translation request signal upon receipt of each input address translation request;

a main bus port for transmitting output address translation requests and for receiving input address translation responses via said main bus, said main bus port generating a response signal on receipt of each address translation response; and means for responding to said address translation request signal by looking for an entry in said secondary address translation cache containing a network address conveyed in an address translation request received by said cluster bus port and, when finding said entry, generating an address translation response containing a port ID included in said entry and forwarding said address translation response to an input port via said cluster bus port and said cluster bus, and when not finding said entry in said secondary address translation cache, forwarding said address translation request from said cluster bus port to said main address translation means via said main bus port and said main bus, and for responding to said response signal by creating a new entry in said secondary address cache relating a network address to a port ID included in said translation response received by said main bus port and forwarding said translation response to an input port vias said cluster bus port and said cluster bus.

10. An address translation system for a network switch which forwards data packets between uniquely addressed network stations connected to its input and output ports, wherein each incoming data packet includes the network address of the packet's destination station, and wherein an input port receiving a data packet consults said address translation system to determine an output port to which the addressed destination station is connected, the address translation system comprising:

a local address translation cache within each input port for storing address-to-port translation information, a plurality of secondary address translation units each corresponding to a separate subset of said input ports and storing address-to-port translation information, and a main address translation unit for storing address-to-port translation information, wherein upon receiving an input data packet containing an address for which its local address translation cache contains translation information for said address, said input port forwards the data packet to an output port indicated by said translation information, wherein upon receiving an input data packet containing an address for which its local address translation cache does not contain translation information for said address, said input port sends a translation request containing said address to its corresponding secondary address translation unit, wherein when a secondary address translation unit receives a translation request conveying an address for which it stores translation information, it returns a translation response conveying said translation information to the input port that sent the address translation request, wherein when a secondary address translation unit receives a translation request conveying an address for which it does not store translation information, it forwards the translation request to said main address translation unit, wherein when said main address translation unit receives an address translation request from a secondary address translation unit, it returns an address translation response conveying translation information for the address contained in the translation request to the secondary address translation unit, wherein when a secondary translation unit receives an address translation response from said main translation unit, it stores address translation information conveyed in the translation response and forwards the translation response to an input port, and wherein when an input port receives a translation response from a secondary address translation unit it stores the translation information conveyed therein in its local address translation cache and forwards an incoming data packet to an output port indicted by said translation information included in said translation response.

* * * * *

UNITED STATES PATENT AND TRADEMARK OFFICE
CERTIFICATE OF CORRECTION

| | | |
|---|---|---|
| PATENT NO. | : 5,940,596 | |
| APPLICATION NO. | : 08/905440 | |
| DATED | : August 17, 1999 | |
| INVENTOR(S) | : Sundar Rajan et al. | |

It is certified that error appears in the above-identified patent and that said Letters Patent is hereby corrected as shown below:

In column 1, line 9, delete "5,754,761" and insert -- 5,754,791 --, therefor.

Signed and Sealed this

Seventeenth Day of May, 2011

David J. Kappos
*Director of the United States Patent and Trademark Office*